United States Patent [19]

Lewiner et al.

[11] Patent Number: 4,992,785

[45] Date of Patent: Feb. 12, 1991

[54] INSTALLATION FOR CONTROLLING AND MONITORING THE DIFFERENT CODED LOCKS OF AN ASSEMBLY

[76] Inventors: Jacques Lewiner, 5, rue Bory d'Arnex, 92210 Saint Cloud; Claude Hennion, 18, rue Flatters, 75005 Paris, both of France

[21] Appl. No.: 71,601

[22] Filed: Jul. 8, 1987

Related U.S. Application Data

[63] Continuation of Ser. No. 755,794, Jul. 17, 1985, abandoned.

[30] Foreign Application Priority Data

Jul. 18, 1984 [FR] France ................................ 84 11399

[51] Int. Cl.[5] ........................ H04Q 9/00; E05B 49/00

[52] U.S. Cl. .................................. 340/825.34; 70/278

[58] Field of Search ...................... 340/825.34, 825.31; 235/375, 380, 382, 382.5; 70/278

[56] References Cited

U.S. PATENT DOCUMENTS

| | | | |
|---|---|---|---|
| 3,800,284 | 3/1974 | Zucker et al. | 340/825.31 |
| 3,860,911 | 1/1975 | Hinman et al. | 340/825.31 |
| 4,352,011 | 8/1982 | Guillou | 235/375 |
| 4,396,914 | 8/1983 | Aston | 340/825.31 |
| 4,494,114 | 1/1985 | Kaish | 340/825.31 |
| 4,511,946 | 4/1985 | Mc Gahan | 340/825.31 |
| 4,558,175 | 12/1985 | Genest et al. | 340/825.34 |
| 4,596,985 | 6/1986 | Bongard et al. | 340/825.31 |
| 4,630,201 | 12/1986 | White | 340/825.34 |
| 4,642,631 | 2/1987 | Rak | 340/825.31 |

OTHER PUBLICATIONS

EP 0044630 A1, 01/27/82, Walter John Aston.
EP 0043270 A1, 01/06/82, Kazuo Mizutani.

*Primary Examiner*—Donald J. Yusko
*Attorney, Agent, or Firm*—Larson and Taylor

[57] ABSTRACT

An installation for controlling and monitoring the different coded locks of an assembly embodying: An issuer for elaborating coded keys for controlling said locks and a reader associated with each lock, adapted for unlocking this lock on simple presentation thereto of a correctly coded key, this issuer and this reader being adapted so that detection by said reader of the code y recorded by said issuer on each new key of order p assigned to the lock associated with this reader results in the invalidation of the code x recorded on the key of order p-1 previously assigned to this lock, each code y being derived from code x by an algorithm $y=f(x)$ stored at least in the issuer. At any time the reader is responsive simultaneously to a number m greater than 2 of a non invalidated codes of the succession x, f(x), $f^2(x)$ . . . $f^n(x)$ and is adapted so that by reading any one of these codes it automatically invalidates all the lower rank codes of the succession considered.

4 Claims, 1 Drawing Sheet

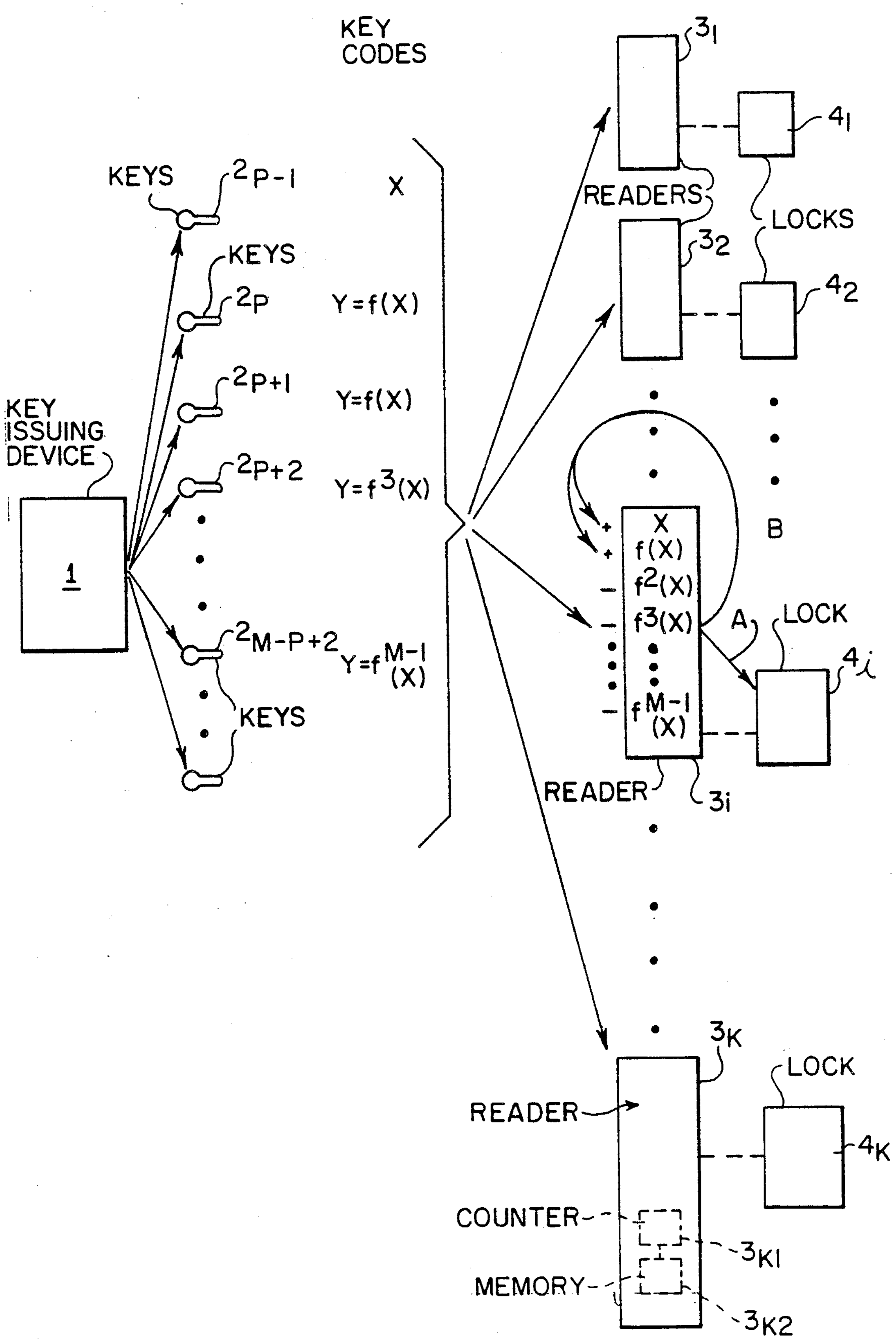
KEY CODES
KEYS
2P-1
X
KEYS
2P
Y=f(X)
2P+1
Y=f(X)
KEY ISSUING DEVICE
2P+2
Y=f3(X)
1
2M-P+2
Y=fM-1(X)
KEYS
31
41
READERS
LOCKS
32
42
X
f(X)
f2(X)
f3(X)
fM-1(X)
B
A
LOCK
4i
READER
3i
3K
READER
LOCK
4K
COUNTER
3K1
MEMORY
3K2

INSTALLATION FOR CONTROLLING AND MONITORING THE DIFFERENT CODED LOCKS OF AN ASSEMBLY

This application is a continuation-in-part, division, of application Ser. No. 766,794 filed July 17, 1985, now abandoned.

FIELD OF THE INVENTION

The invention relates to installations for controlling and monitoring the different coded locks of an assembly comprising a relatively high number of such locks this number being preferably greater than 50 and even greater than 100.

BACKGROUND OF THE INVENTION

The invention relates more particularly, but not exclusively, among these installations because it is in their case that its application seems to offer the greatest interest, to those equipping hotels comprising a large number of rooms, each of these rooms being accessible through a door equipped with a coded lock, which lock is controllable electrically by means of a correspondingly coded key.

The coded keys in question are preferably cards carrying a code recorded in magnetic or optical form, or else portable emitters of codes in the form of electromagnetic or ultrasonic waves, and the codes considered are numbers expressed by successions of binary signals.

The coded keys may also be formed by an incorporporeal code confided in an intelligible way to an entitled user, for example in the form of a succession of figures and/or letters, and intended to be composed on a keyboard disposed in the vicinity of the lock or to be reproduced in any other desirable way.

In the installations of the above mentioned kind, the people entitled to unlock a given lock are only temporarily so entitled and change frequently.

An ill disposed user should therefore be prevented from being able to continue unlocking the lock considered beyond the expiry of the period during which he was allowed to do so, by using a copy of the key which had been entrusted to him at that time or by using this key itself, kept by him beyond said expiry date.

To obtain such a result, it has already been proposed to automatically invalidate the key assigned to each lock by the simple presentation to this lock of a new key held by the next entitled user.

In some known embodiments of the installations designed for this purpose the code assigned to each key by a central key issuer comprises two recorded portions respectively on two distinct zones of the key, namely a first portion assigned directly to unlocking the lock, and a second portion assigned to changing the code.

For simplicity's sake, a key entrusted to a first user entitled to unlock a given lock will be called hereafter "first key" and a key subsequently entrusted to a second user whom it is desired to entitle to unlock the lock in its turn while suppressing the entitlement of the first will be called "second key", and the code portions recorded by the central key issuer on the two zones of the first key will be called respectively A and B and the code portions recorded respectively on the two zones of the second key will be called B' and C.

In known embodiments the codes B and B' are identical.

The lock concerned comprises originally means for making unlocking thereof dependent on the reading of the partial code A in the first zone of a key, means for storing the partial code B carried in the second zone of such a key having the partial code A on its first zone, and comparison means.

As long as the correct first key is presented to the lock reading of the partial code A of its first zone provides directly unlocking of this lock and the partial code B is only stored in memory.

During presentation of the second key, the section for locking the lock no longer reads the correct partial code A in the first zone of this key, but the partial code B.

It is then that the comparison means of the lock come into action: they compare the partial code (here B) previously stored and coming from the second zone of the first key with the new partial code read from the first zone of the second key.

The resulting identification of such a comparison results in unlocking the lock, of causing the code thus identified to be adopted by the lock, that is to say here the partial code B. as new unlocking code and in invalidating, by deletion or otherwise, the initial partial unlocking code A.

It is then the partial code C of the second zone of the second key which plays the role of the preceding partial code B, and so on.

Such an approach—in particular forming the subject matter of U.S. Pat. Nos. 3,821,704, 3,860,911, 4,207,555 and 4,213,118 —has the important advantage of allowing automatic invalidation of the out of date keys by the simple subsequent use of the valid keys without it being necessary to make any other local changes.

But it is not proof against frauds.

In fact, it is relatively easy for an ill disposed user who succeeds in obtaining two successive entitlement keys assigned to the same lock, by comparing the codes recorded on these two keys, to detect the partial code common thereto, namely B in the above example and so to deduce therefrom the partial unlocking code (here C) of the next key in the series corresponding to the lock considered and to provide such a following key himself without the knowledge and in the place of the central key issuer.

With this next key, although "falsely" issued, the lock considered can be unlocked as well as with the next "true" key.

To benefit from the advantage mentioned above while making impossible the fraud which has just been mentioned it has been proposed, in a control and monitoring installation comprising again, as before, an issuer for preparing coded keys for controlling the locks and a reader associated with each lock, adapted for unlocking this lock on simple presentation thereto of a correctly coded key, this issuer and this reader being adapted so that detection by said reader of the code y recorded by said issuer on each new key of order p assigned to the lock associated with this reader causes invalidation of the code x recorded on the key of order p-1 previously assigned to this lock, to make each code y derivable from code x by an algorithm $y=f(x)$ stored at least in the issuer.

By "algorithm" is meant in the present text a set of digital operations causing a second number y to correspond to a first number x.

Each of the issuing and reading apparatus is then equipped so as to use the algorithm in an appropriate way.

Thus the issuer preparing the keys successively intended for unlocking in turn the lock equipped with the reader considered is adapted so as to record respectively on the successive keys the codes x, f(x), $f^2(x)$ . . . $f^n(x)$ . . .

In the preceding paragraph, n designates an integer, $f^n(x)$ signifies $f[f^{n-1}(x)]$ and the symbol f(x) is equivalent to $f^1(x)$.

As for the reader associated with the lock considered, it is adapted so as to successively compare the codes read from the different keys with codes x, f(x), $f^2(x)$ . . . , $f^n(x)$ . . . and to unlock the lock when the comparison made reveals an identity.

Furthermore, the reader is equipped with means for automatically invalidating each code $f^p(x)$ when the key bearing the code $f^{p+1}(x)$ is presented thereto.

Thus, each reader-lock subassembly is adapted so that at a given time the lock may be unlocked by presentation to the reader of one or other of two codes $f^p(x)$ and $f^{p+1}(x)$, the presentation of the first of these codes resulting in only unlocking of the lock whereas presentation of the second code results not only in unlocking, but also in invalidating the first code and the sensitization of the reader to the next code $f^{p+2}(x)$ of the series the roles played respectively just before such a presentation of the second code $f^{p+1}(x)$ by the first two codes being played respectively from this time by the two codes $f^{p+1}(x)$ and $f^{p+2}(x)$.

In the known embodiments of such an installation, each reader is responsive each time to two codes, namely the codes $f^p(x)$ and $f^{p+1}(x)$ in the above example.

Such an approach requires strict synchronization between the issuer and each reader.

It may in fact happen that a "first key" prepared by the issuer for a given lock is not effectively used before the next key or "second key" is prepared by said issuer.

Such a fault in use causes a fault of progression in the succession of codes readable by means of the reader associated with said lock which makes the "second key" inoperative for opening said lock.

This drawback is particularly manifest when each of the keys considered is entitled to open a plurality of locks: in such a case, it may happen that one at least of said locks has not been effectively actuated by the corresponding "first key" during the period of entitlement of this key.

SUMMARY OF THE INVENTION

The present invention overcomes this disadvantage.

For this, each reader is made responsive at any time to a number m greater than 2 of non invalidated codes of the succession of codes $f^p(x)$, $f^{p+1}(x)$, $f^{p+2}(x)$ . . . which may be derived from each other by the algorithm f(x).

This reader is then adapted so that by reading any one of the valid codes of this succession, it automatically invalidates all the lower rank codes of said succession.

Thus, the lock associated with said reader may be opened at any time by the last key prepared by the issuer for this lock.

The number m is chosen as a function of the real risk presented by the above mentioned fault: it is preferably between 5 and 100, being for example of the order of 10.

The different codes of the succession considered may be recorded beforehand in a memory of the reader concerned, the number of these valid codes decreasing progressively with each successive invalidation of the keys.

Such an approach it is true has the advantage of making the real local use of the algorithm f(x) useless, but it requires the memory of the reader being reloaded chronically.

In all cases, the reader may be equipped with means for counting and recording the number of changes of code taking place from the beginning of the life of the lock or from a given resetting time.

BRIEF DESCRIPTION OF THE DRAWINGS

The single figure in the drawings is a schematic block diagram representation of one preferred embodiment of the invention.

DESCRIPTION OF THE PREFERRED EMBODIMENTS

Referring to the single figure in the drawings, an embodiment of the invention is illustrated which includes a key issuing device or issuer 1, a series of m keys $2_{p-1}$, $2_p$, $2_{p+1}$, $2_{p+2}$ . . . $2_{m-p+2}$ issued thereby, a series of k key readers $3_1$, $3_2$, . . . $3_i$ . . . $3_k$ associated with a corresponding series of k locks $4_1$, $4_2$ . . . , $4_i$ . . . $4_k$. The example illustrated shows what happens when a key $2_{p+1}$, having a code $f^2(x)$ is presented to a reader $3_i$, which is initially sensitive to m codes. (In the drawings a minus ("−") sign indicates sensitivity of the reader to the corresponding code while a positive ("+") sign indicates non-sensitivity.) In the illustrated example, reader $3_i$, when key $2_{p+1}$ is presented thereto, effects the following actions: (i) unlocks the corresponding lock $4_i$: and (ii) invalidates the lower order codes x and f(x).

As indicated for reader $3_k$, a conventional counter $3_{k1}$ and a conventional memory or other recording means $3_{k2}$ are preferably included in each reader for counting and recording the number of code changes taking place after a starting or resetting time.

In an interesting embodiment, the algorithm y=f(x) adopted for all the readers is the same but the starting code x, of the succession x, f(x), $f^2(x)$, . . . $f^n(x)$ . . . which is initially assigned to unlocking each lock, differs from those initially assigned to the other locks.

In such a case, as before, the adequate succession of codes may be recorded in a memory of each reader: identification of the first code, of the succession, valid at a given time may then be obtained by simply counting, as mentioned above, the number of changes of code taking place from a given starting time, which may be a resetting time which counting is of course completed by the knowledge of a starting code assigned to the lock concerned.

This solution also simplifies the construction of the issuer 1 since it uses in all a single algorithm for preparing all the keys 2.

This simplification is very important since, for example for the application of the invention to use in a hotel having 100 rooms, it is tantamount to dividing by 100 the number of algorithms recorded in the issuer as well as the number of corresponding calculation and transformation circuits.

The counter-part of this simplification—namely the need to correctly identify the different starting codes assigned to the different locks and the numbers of subsequent code changes—only removes a small part of the advantages thus obtained.

Following which, whatever the embodiment adopted, an installation is finally obtained for controlling and monitoring the different coded locks of an assembly, whose construction and operation follows sufficiently from what has gone before.

This installation has a certain number of advantages with respect to those known heretofore.

In particular, with respect to prior installations of the first type mentioned in the introduction, it makes the frauds mentioned impossible: in fact, the ill intentioned user who succeeds in obtaining two keys successively entitled to unlock a given lock may, it is true, deduce therefrom the two codes x and y recorded respectively on these two keys, but he cannot deduce therefrom the algorithm f(x) which relates these two codes for the number of algorithms relating two numbers together is one infinite: he cannot then "falsely" prepare a next key in the series concerned;

the richness of each unlocking code recorded on a given key is very much greater than those of the partial codes of said prior installations because the zone available for recording this code on each key is twice as great.

With respect to the installations of the second type mentioned in the introduction,. the installation proposed here overcomes the need for "synchronization" between the issuer and the readers, the lack of use of some "first keys" not resulting here in the neutralization of the corresponding "second keys".

As is evident, and as it follows moreover already from what has gone before, the invention is in no wise limited to those of its modes of application and embodiments which have been more especially considered; it embraces, on the contrary, all variants thereof particularly those in which the algorithm for elaborating the code y from the preceding code x is a function not only of this preceding code, but also of a number assigned to the lock-reader assembly concerned, which number is recorded both in this assembly and in the issuer, particularly in the case where the number of said assemblies is particularly high.

We claim:

1. In an installation for controlling and monitoring the differently coded locks of a system of such locks, said installation comprising: key issuing means for producing a plurality of coded keys having codes recorded thereon for controlling said locks and a reader means associated with each lock, for unlocking the associated lock in response to the simple presentation thereto of a correctly coded key, said key issuing means and reader means being adapted so that detection by said reader means of a code y recorded by said key issuing means on each new key of order p assigned to the lock associated with this reader means results in the invalidation of a code x recorded on the key of order $p-1$ previously assigned to this lock, each code y being derived from code x by an algorithm $y=f(x)$ stored in at least the key issuing means, the improvement wherein said reader means is at all times during the intended operation thereof responsive simultaneously to a number m, greater than 2, of codes of an increasing succession of ranked codes x, f(x), $f^2(x) \ldots f^n(x)$ which have not been previously invalidated and provides, responsive to reading any one of these codes, for automatically invalidating all codes in the succession of ranked codes which are of a lower rank than the one code read thereby.

2. The installation according to claim 1, wherein the number m is between 5 and 100.

3. The installation according to claim 1, wherein the reader means includes means for counting and recording the number of code changes taking place from a starting or resetting time.

4. The installation according to claim 1, wherein a single algorithm is used for the different locks, the codes assigned to the unlocking of these different locks at any time differing from each other because of the different choices adopted for the respective starting codes.

* * * * *